US012718256B2

(12) United States Patent
Negandhi et al.

(10) Patent No.: US 12,718,256 B2
(45) Date of Patent: Aug. 25, 2026

(54) ARTIFICIAL INTELLIGENCE-AIDED RECOMMENDATION FOR EXPLORATORY NETWORK ANALYSIS

(71) Applicant: INTERNATIONAL BUSINESS MACHINES CORPORATION, Armonk, NY (US)

(72) Inventors: Vrunda Ravindra Negandhi, Pune (IN); Srinivasan S. Muthuswamy, Bangalore (IN); Sudheesh S. Kairali, Kozhikode (IN); Sarbajit K. Rakshit, Kolkata (IN)

(73) Assignee: International Business Machines Corporation, Armonk, NY (US)

( * ) Notice: Subject to any disclaimer, the term of this patent is extended or adjusted under 35 U.S.C. 154(b) by 213 days.

(21) Appl. No.: 18/182,962

(22) Filed: Mar. 13, 2023

(65) Prior Publication Data

US 2024/0311847 A1 Sep. 19, 2024

(51) Int. Cl.
*G06Q 30/018* (2023.01)

(52) U.S. Cl.
CPC ................................ *G06Q 30/0185* (2013.01)

(58) Field of Classification Search
CPC .................................................. G06Q 30/0185
See application file for complete search history.

(56) References Cited

U.S. PATENT DOCUMENTS 5,819,226 A * 10/1998 Gopinathan ........... G06Q 20/40 705/44
10,977,311 B2 4/2021 Sathish et al.
2002/0133721 A1* 9/2002 Adjaoute ............... G06Q 20/40 726/23
2012/0101937 A1* 4/2012 Zoldi ..................... G06Q 40/12 705/38
2012/0278868 A1* 11/2012 Boding .................. G06Q 20/12 707/E17.014
2013/0138587 A1* 5/2013 Patil ....................... G06N 3/126 706/12

(Continued)

OTHER PUBLICATIONS

M. Das, R. Cui, D. R. Campbell, G. Agrawal and R. Ramnath, "Towards methods for systematic research on big data," 2015 IEEE International Conference on Big Data (Big Data), Santa Clara, CA, USA, 2015, pp. 2072-2081, doi: 10.1109/BigData.2015.7363989. (Year: 2015).*

(Continued)

*Primary Examiner* — Corey Russ
(74) *Attorney, Agent, or Firm* — CHIP LAW GROUP

(57) ABSTRACT

Exploratory network analysis aided by an artificial intelligence recommender includes determining one or more current activities in response to detecting one or more processor-executable instructions input to a computer system by a user. A best next activity is predicted in response to matching the one or more current activities with an electronically stored pattern of activities. The predicting is performed using a machine learning model trained with knowledge components generated from patterns of past activities. A recommendation based on the best next activity is output, the recommendation recommending to the user one or more additional processor-executable instructions to input to the computer system.

18 Claims, 6 Drawing Sheets

(56) References Cited

U.S. PATENT DOCUMENTS

| | | | | |
|---|---|---|---|---|
| 2014/0082730 | A1* | 3/2014 | Vashist | H04L 63/1416 726/23 |
| 2015/0309855 | A1* | 10/2015 | Agnihotram | G06F 11/079 714/37 |
| 2016/0078365 | A1* | 3/2016 | Baumard | H04L 63/1425 706/12 |
| 2016/0142435 | A1* | 5/2016 | Bernstein | H04L 63/1425 726/23 |
| 2016/0210631 | A1* | 7/2016 | Ramasubramanian | G06Q 20/4016 |
| 2017/0357912 | A1* | 12/2017 | Hindi | G06N 20/00 |
| 2018/0365696 | A1* | 12/2018 | Yan | G06F 18/2321 |
| 2019/0205839 | A1* | 7/2019 | Dotan-Cohen | H04L 67/535 |
| 2020/0057946 | A1 | 2/2020 | Singaraju et al. | |
| 2020/0259700 | A1* | 8/2020 | Bhalla | G06F 3/0482 |
| 2021/0319329 | A1* | 10/2021 | Yang | G06F 16/9024 |
| 2021/0334822 | A1* | 10/2021 | Pati | G06Q 40/08 |
| 2021/0385135 | A1* | 12/2021 | Côté | G06F 17/18 |
| 2022/0020026 | A1* | 1/2022 | Wadhwa | G06N 5/022 |
| 2022/0139010 | A1* | 5/2022 | Du | G06F 16/26 345/440.2 |
| 2022/0277210 | A1* | 9/2022 | Malhotra | H04L 67/14 |
| 2022/0351209 | A1* | 11/2022 | Kishore | G06Q 20/4014 |
| 2023/0421591 | A1* | 12/2023 | Oren | H04L 63/1425 |
| 2024/0062041 | A1* | 2/2024 | Choudhary | G06N 3/042 |
| 2024/0354605 | A1* | 10/2024 | Flinn | H04L 51/216 |

OTHER PUBLICATIONS

Al Marri M. et al., “Financial Fraud Detection using Machine Learning Techniques,” Thesis, Rochester Institute of Technology, 2020, 43 pg.

Leite, A. et al., “Neva: Visual analytics to identify fraudulent networks,” InComputer Graphics Forum, Sep. 2020, vol. 39, No. 6, pp. 344-359.

Onwudebelu, U., “The Third Wave of AI: Fraud Detection via Knowledge Graphs within Explainable AI,” [online] ResearchGate, retrieved from the Internet: <https://www.researchgate.net/publication/354451288_The_Third_Wave_of_AI_Fraud_Detection_via_Knowledge_Graphs_within_Explainable_AI>.

Chang, R., “Knowledge Graphs for Anti-Money Laundering and Transaction Monitoring,” [online] FI Consulting © 2023, retrieved from the Internet: <https://ficonsulting.com/insight-post/knowledge-graphs-for-anti-money-laundering-and-transaction-monitoring/>, 12 pg.

Mell, P. et al., The NIST Definition of Cloud Computing, National Institute of Standards and Technology, U.S. Dept. of Commerce, Special Publication 800-145, Sep. 2011, 7 pg.

No Author. “Using Knowledge Graphs for Anti-Money Laundering and Transaction Monitoring”, F.I Consulting, 2020, 10 pages.

* cited by examiner

ARTIFICIAL INTELLIGENCE-AIDED RECOMMENDATION FOR EXPLORATORY NETWORK ANALYSIS

BACKGROUND

This disclosure relates to network analysis, and, more particularly, to guided network analysis based on recommendations generated with artificial intelligence.

Many different systems, including social and technical ones, can be characterized as networks. A network is a collection of interconnected entities or nodes that communicate or exchange data with one another. Network analysis identifies relationships between the entities and determines how the network functions based on the connections or links among the entities, as well as characteristics of the entities themselves.

SUMMARY

In one or more embodiments, a method includes determining, by an activity tracker, one or more current activities in response to detecting, by a processor of a computer, one or more processor-executable instructions input to the computer by a user. The method includes predicting, by a next-action recommender, a best next activity in response to matching the one or more current activities with an electronically stored pattern of activities. The next-action recommender performs the predicting using a machine learning model trained with knowledge components generated, by a pattern recognition engine, from patterns of past activities determined by the activity tracker. The method includes outputting a recommendation based on the best next activity, the recommendation recommending to the user one or more additional processor-executable instructions to input to the computer.

The foregoing and other implementations can each optionally include one or more of the following features, alone or in combination. Some example embodiments include all the following features in combination.

In one aspect, the past activities for predicting the best next activity include applying a data filter, such as a data drill-down operation, and/or applying an annotation to user-selected data.

In another aspect, a knowledge graph is constructed, the knowledge graph comprising knowledge components generated by the pattern recognition engine.

In another aspect, in response to determining, based on a search of patterns of past activities, that the pattern of current activities does not match an electronically stored pattern of activities, a compilation of current activities is initiated. The compilation is used to generate and electronically store a new pattern of activities.

In another aspect, metadata associated with the activities can be extracted and integrated in a knowledge graph.

In another aspect, a pattern of current activities can be correlated with past decisions to generate a final decision for a exploratory network analysis.

In another aspect, an objective of an exploratory network analysis is the detection of fraud or money laundering. The exploratory network analysis identifies likely suspicious activity, distinguishing the suspicious activity from a false positive.

In one or more embodiments, a system includes one or more processors configured to initiate executable operations as described within this disclosure.

In one or more embodiments, a computer program product includes one or more computer-readable storage media and program instructions collectively stored on the one or more computer-readable storage media. The program instructions are executable by a processor to cause the processor to initiate operations as described within this disclosure.

This Summary section is provided merely to introduce certain concepts and not to identify any key or essential features of the claimed subject matter. Other features of the inventive arrangements will be apparent from the accompanying drawings and from the following detailed description.

DETAILED DESCRIPTION

Figure 1:
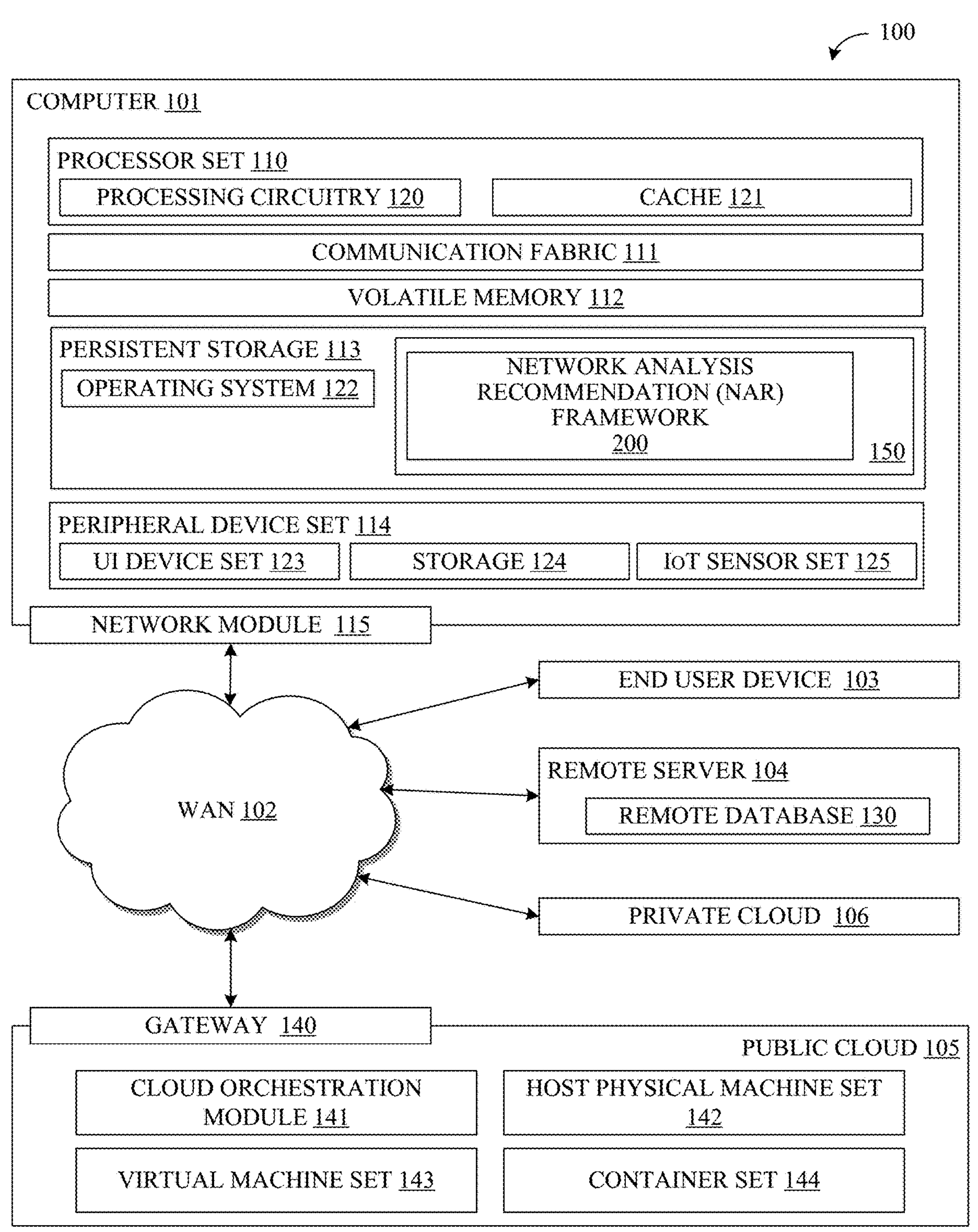
FIG. 1 illustrates an example of a computing environment that is capable of implementing a network analysis recommendation (NAR) framework.

While the disclosure concludes with claims defining novel features, it is believed that the various features described within this disclosure will be better understood from a consideration of the description in conjunction with the drawings. The process(es), machine(s), manufacture(s) and any variations thereof described herein are provided for purposes of illustration. Specific structural and functional details described within this disclosure are not to be interpreted as limiting, but merely as a basis for the claims and as a representative basis for teaching one skilled in the art to variously employ the features described in virtually any appropriately detailed structure. Further, the terms and phrases used within this disclosure are not intended to be limiting, but rather to provide an understandable description of the features described.

This disclosure relates to network analysis, and, more particularly, to guided network analysis based on recommendations generated with artificial intelligence. In accordance with the inventive arrangements disclosed herein, methods, systems, and computer program products are provided that are capable of predicting a best next action during an exploratory network analysis. The inventive arrangements implement one or more machine learning models for predicting the best next action. An aspect of the machine learning, as implemented by the inventive arrangements, is the identifying of patterns of activities and predicting the best next action based on the patterns.

An "activity," as used herein, means a computer action performed by a user during an exploratory network analysis. The action is determined by a processor of a computer and corresponds to one or more processor-executable instructions input to the computer by a user during the exploratory network analysis. Thus, in one aspect, the inventive arrangements train the machine learning model using patterns of activities in analyzing a network rather than patterns of the network itself. In contexts such as detecting money laundering and fraud, for example, it can be difficult to train a machine learning model to detect fraud or money laundering based on network patterns. The number of instances, in such situations, is typically far less than needed for training the machine learning model. Any machine learning model so trained is thus likely to lack a desired level of predictive accuracy. Moreover, as new patterns emerge, updating the machine learning model to enable the model to recognize the new patterns becomes problematic.

In accordance with the inventive arrangements, by contrast, activities of users performing an exploratory analysis of the network are used to train one or more machine learning models. Patterns of activities that prove successful (e.g., detecting money laundering or fraud) are used by the inventive arrangements in training machine learning models through supervised learning to predict the best activity to next pursue during an on-going exploratory network analysis. The best activity is the one most likely to lead to a correct and complete network analysis (e.g., distinguish actual fraud or money laundering from a false positive). Based on each prediction of a best next activity, the inventive arrangements output a recommendation. The recommendation recommends to the user one or more additional processor-executable instructions to input to the computer during the exploratory network analysis.

In the context of financial fraud or money laundering detection, for example, often the patterns of entity behaviors are new, and an investigator determines the patterns via exploratory analysis into money flows to identify suspicious patterns. The effectiveness of such exploration depends on the knowledge of the investigator. The inventive arrangements can capture the knowledge of the investigator and leverage the knowledge to assist another, perhaps less experienced, investigator by providing recommendations of next activities during a subsequent exploratory analysis. In certain embodiments described herein, the inventive arrangements further predict a final decision at the conclusion of the exploratory network analysis. For example, the inventive arrangements can predict whether entities' behaviors indicate financial fraud or money laundering or only a false positive.

In certain embodiments, the inventive arrangements include an activity tracker that is capable of tracking activities performed by a user during an exploratory network analysis and storing the information in a knowledge component. A "knowledge component," as used herein, means user-initiated operations performed by a computing system in performing an exploratory network analysis. As an example, a knowledge component may include one or more filters applied to a data set, one or more annotations applied to the data set, and/or metadata stored as a data structure. "Data structure," as used herein, means a collection of data values, the relationships among the data, and the functions and/or operations that can be applied to the data.

The data structures, in some embodiments, are used to construct a knowledge graph. The activity tracker can capture filters the user applied during the exploratory analysis, such as a data drill down operation performed, and annotations the user made to specific data indicating a noteworthy pattern. As used herein, "drill down" means a computer-implemented user activity that allows a user to shift from one level of data to more detailed, granular level of data within the same dataset, the data at the detailed, granular level providing more specific or more detailed information than that of the data at the prior level. An example of a drill down activity is accessing database information starting from a general category and moving (in response to processor-executed instructions) through a data hierarchy of field, file, and record. The drill down, in the context of exploratory network analysis to detect fraud, for example, can change a user's focus within a network of transactions by shifting perspective from a first person to another person or another part of the network.

Additionally, the activity tracker can capture the final outcome (e.g., suspicious activity or a false positive) of the exploratory network analysis. The activities, including corresponding metadata, are integrated in and electronically stored as knowledge components.

In other embodiments, the inventive arrangements include a pattern detector. One aspect of the pattern detector is a capability of identifying metadata corresponding to patterns likely to be significant to a final determination. A pattern detected can comprise multiple datasets corresponding to edge-connected nodes, each node comprising a dataset, which is described or explained by metadata. Accordingly, as used herein, "metadata" means data that explains or describes the data included in a dataset that is part of a network undergoing an exploratory network analysis. For example, in the context of exploratory network analysis for detecting fraud or money laundering, the network's edge-connected nodes can comprise datasets corresponding to transactions. The datasets comprise data related to transactions, and the metadata describes or explains the data pertaining to the transactions.

For example, the metadata can describe the country of origin of a party to a transaction, country of operation of the party, the party's source of income, occupation, and other attributes. The metadata can detail, for example, the number of transactions and their monetary amounts that the party engaged in with a specific financial institution. Statistical measures, can be incorporated in the metadata, such as number of transactions the party undertakes per month, average monetary amounts of the transactions, how many are domestic versus international transactions, and the like. The metadata is incorporated in the knowledge component, and in some embodiments, included in a knowledge graph.

In still other embodiments, the inventive arrangements include a next-action recommender. Based on information captured in the knowledge component, the next-action recommender recommends one or more activities based on a current set of actions performed by a user. Recommended activities are presented sequentially as best next actions. Each best next action is one most likely, given other existing conditions, to lead to a correct exploratory network analysis. The likelihood is determined by the inventive arrangements implementing one or more machine learning models. In some arrangements, the next-action recommender optionally recommends a final decision based on the current activities performed by the user and correlating the current activities to the activities in the knowledge graph corresponding to a past decision that previously proved to be correct.

Further aspects of the inventive arrangements are described below with reference to the figures. For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Referring to FIG. 1, computing environment 100 contains an example of an environment for the execution of at least some of the computer code in block 150 involved in performing the inventive methods, such as network analysis recommendation (NAR) framework 200 implemented as executable program code or instructions. NAR framework 200 is capable of predicting the best next actions to perform during an on-going exploratory network analysis. The predictions can be generated in real time while the exploratory network analysis is in progress. The predictions are generated by one or more machine learning models trained to predict activities based on past patterns of activities that led to a successful conclusion of an exploratory network analysis. Current patterns can be correlated with past patterns by NAR framework 200 to determine a final decision for an exploratory network analysis.

Computing environment 100 additionally includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and NAR framework 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 150 in persistent storage 113.

Communication fabric 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid-state storage devices. Operating system 122 may take several forms, such as various known proprietary operating systems or open-source Portable Operating System Interface type operating systems that employ a kernel. The code included in block 150 typically includes at least some of the computer code involved in performing the inventive methods.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (e.g., secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

End user device (EUD) 103 is any computer system that is used and controlled by an end user (e.g., a customer of an enterprise that operates computer 101) and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (e.g., private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Figure 2:
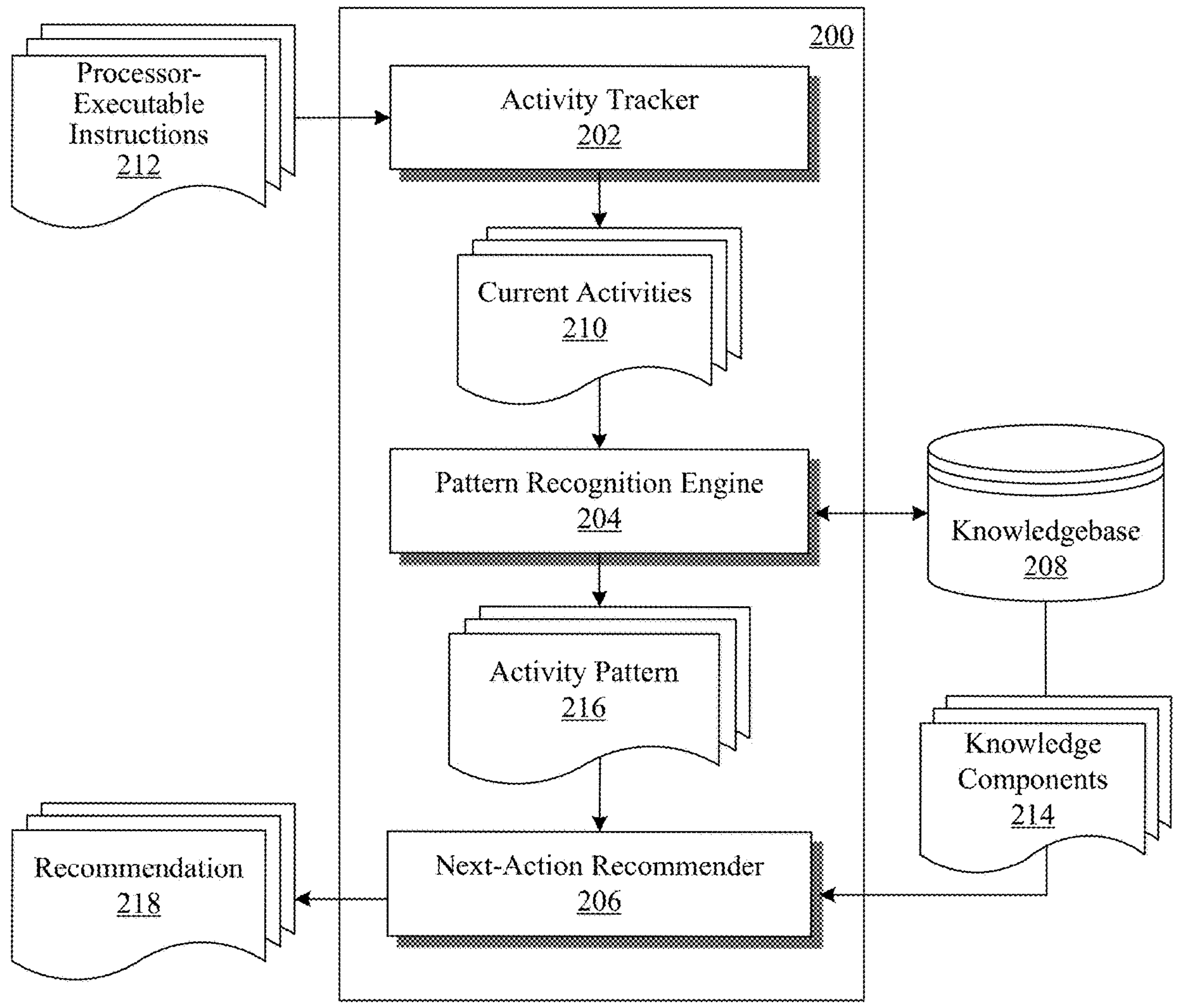
FIG. 2 illustrates an example architecture for the executable NAR framework of FIG. 1.

FIG. 2 illustrates an example architecture for the executable NAR framework 200 of FIG. 1. In the example of FIG. 2, NAR framework 200 illustratively includes activity tracker 202, pattern recognition engine 204, next-action recommender 206, and knowledgebase 208.

Figure 3:
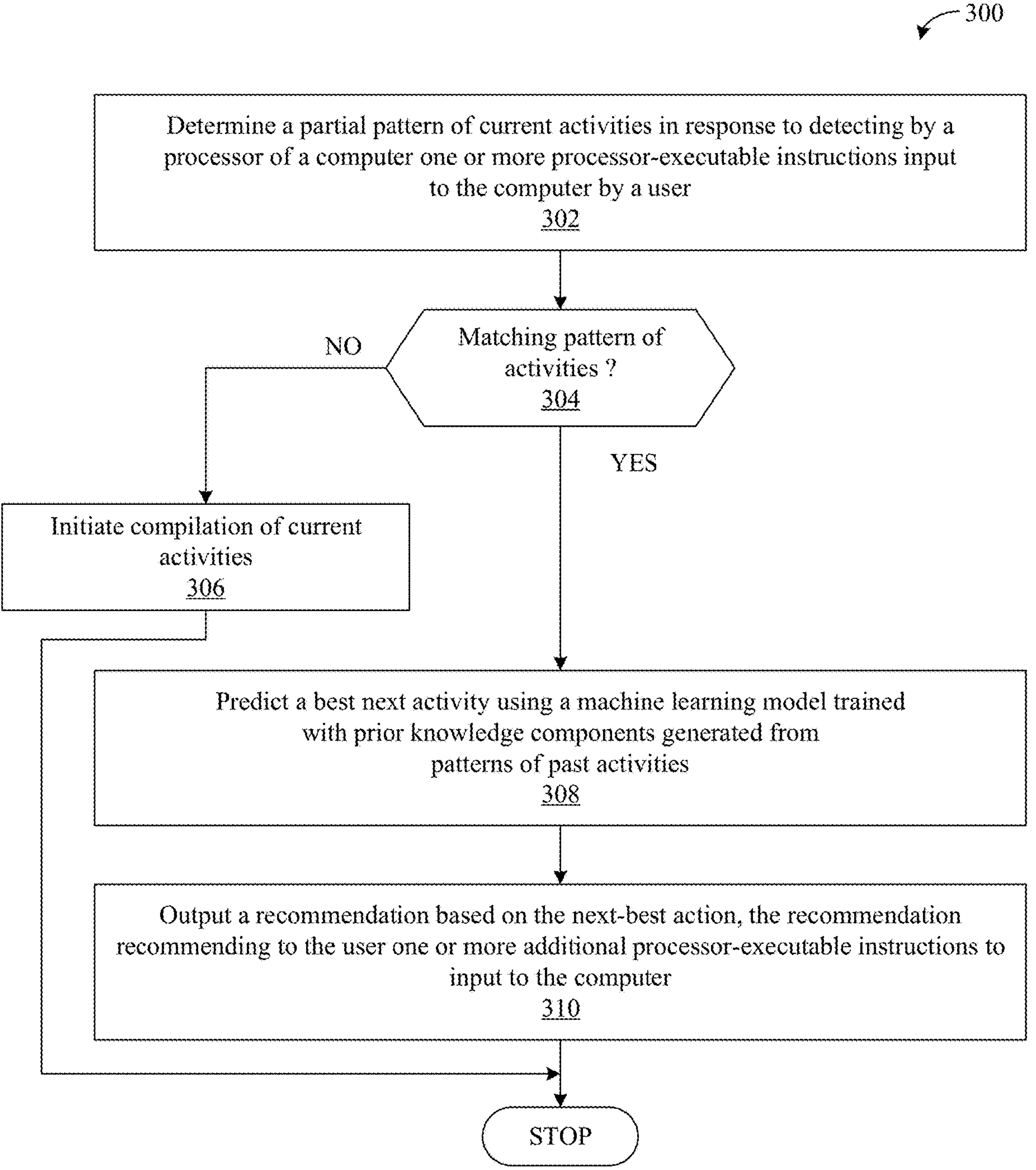
FIG. 3 illustrates an example method of operation of the executable NAR framework of FIGS. 1 and 2.

FIG. 3 illustrates an example method 300 of operation of NAR framework 200 illustrated in FIGS. 1 and 2. Referring to FIGS. 2 and 3 collectively, in block 302, activity tracker 202 captures one or more current activities 210. Current activities 210 correspond to processor-executable instructions 212 input to a computer by a user. The computer may implement or be operatively coupled to a computer that implements NAR framework 200. The computer's processor can detect processor-executable instructions 212, and activity tracker 202 can determine each of current activities 210 from the corresponding instructions.

Current activities 210 are performed as part an on-going exploratory analysis. Activity tracker 202 can capture the activities in real time in response to the detection of processor-executable instructions 212 corresponding to the activities. For example, activity tracker 202 can capture a user's applying a data filter to filter out certain entities and/or transactions. Activity tracker 202, for example, can capture the user's performing a data drill-down operation. For example, activity tracker 202 can capture the user's "pinning" an object of interest, applying an annotation to a user-selected object, and/or various other computer-implemented activities.

In block 304, pattern recognition engine 204 searches knowledgebase 208 for an electronically stored pattern of activities that matches current activities 210. If, in block 304, no match is found, then in block 306 pattern recognition engine 204 initiates compiling additional activities captured by activity tracker 202 during the still on-going exploratory network analysis. The additional activities are compiled with current activities 210. NAR framework 200 combines the compiled activities to generate a new pattern. The new pattern can be processed by pattern recognition engine 204 for future use in subsequent exploratory network analyses.

Pattern recognition engine 204, at each step of an on-going exploratory network analysis identifies certain information (e.g., metadata) for generating one or more knowledge components 214. Metadata associated with prior patterns of activities captured during different exploratory network analyses can be extracted from the past activities and integrated in knowledge components 214. Pattern recognition engine 204, in certain embodiments, implements a generative model for generating knowledge components 214. In some embodiments, pattern recognition engine 204 optionally constructs a knowledge graph (FIGS. 4A through 4D) from knowledge components 214. As described in greater detail below, the knowledge graph can be input to a machine learning model that predicts a best next action and, during a user's on-going exploratory network analysis, recommends the action to the user.

In the context of detecting money laundering as described below, for example, if the user is looking into a bank account involved in various transactions involving various counterparties, and the user chooses to examine a specific counterparty, then pattern detector 240 identifies metadata that describes and distinguishes that counterparty. The metadata may indicate, for example, that the transaction involves more than $20,000 and/or that the counterparty resides in a known tax heaven. Activities determined to be significant, and any corresponding metadata, are aggregated into a knowledge component and stored in knowledgebase 208. Knowledge components 214 are used to train one or more machine learning models implemented by next-action recommender 206. Next-action recommender 206 can implement different machine learning models depending on a specific application of exploratory network analysis. For example, in the context of detecting money laundering described below, a machine learning classifier can be implemented by next-action recommender 206. The machine learning classifier can comprise one or more of a neural network, logistic regression, random forest, decision tree, or naïve Bayes model. In certain embodiments, the machine learning model implemented by next-action recommender 206 is a graph convolutional neural network (FIGS. 5A and 5B). The machine learning model, in certain embodiments, is trained using multiple knowledge graphs (FIGS. 4A through 4D) generated from knowledge components 214 by pattern recognition engine 204.

If in block 304, pattern recognition engine 204 matches current activities 210 with activity pattern 216, then in block 308 next-action recommender 206 predicts, based on activity pattern 216, a best next activity to implement (e.g., in real time) during the on-going exploratory network analysis. Next-action recommender 206 feeds activity pattern 216 into the machine learning model trained with knowledge components 214 generated by pattern recognition engine 204 from patterns of past activities associated with an exploratory network analysis. The machine learning, in certain embodiments, is trained using multiple knowledge graphs (FIGS. 4A through 4D) generated from knowledge components 214.

In block 310, next-action recommender 206 outputs recommendation 218. Recommendation 218 corresponds to the best next activity predicted with the machine learning model. To implement the best next activity predicted, recommendation 218 recommends to the user one or more additional processor-executable instructions to input to the computer. Optionally, next-action recommender 206 recommends a final decision based on current and predicted activities. Next-action recommender 206 can determine the final decision by correlating the activities (e.g., represented in a knowledge graph) with past decisions stemming from the same activities.

FIGS. 4A-4D illustrate certain operative features of NAR framework 200. The operative features are illustrated in the context of performing an example exploratory network analysis to detect incidents of money laundering.

Figure 4A:
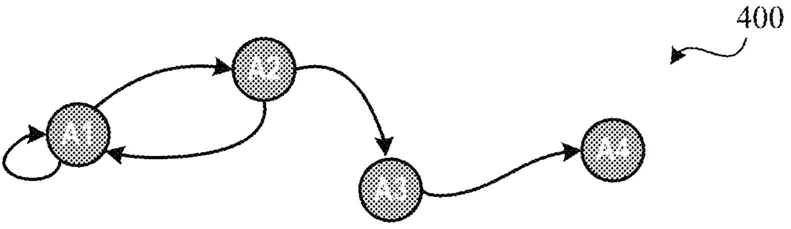
FIGS. 4A through 4D illustrate example knowledge graphs generated by the executable NAR framework of FIGS. 1 and 2.
Figure 5A:
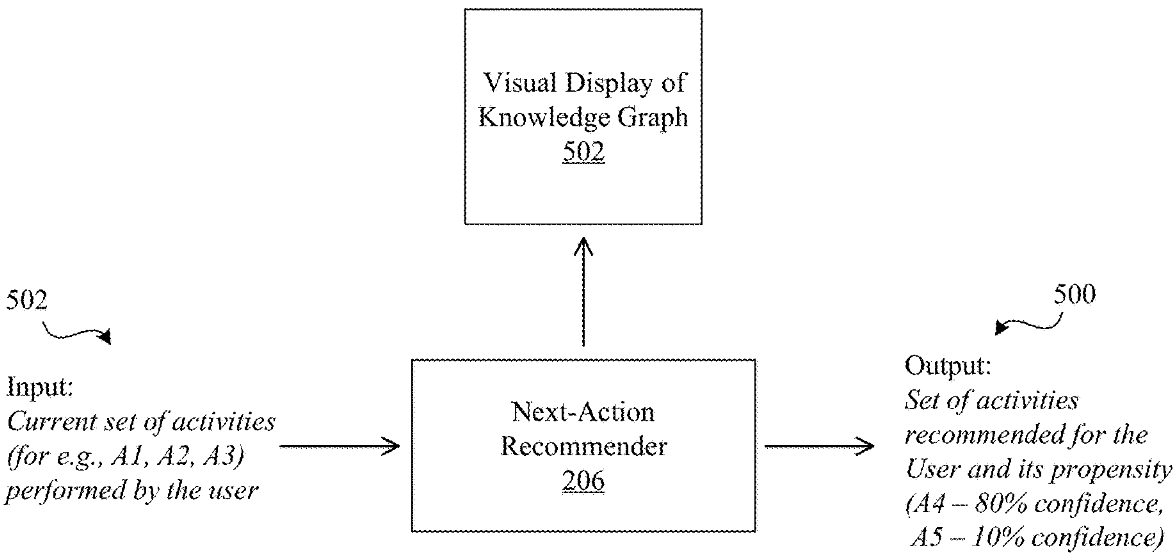
FIGS. 5A and 5B illustrate example machine learning models implemented by the executable NAR framework of FIGS. 1 and 2.
Figure 5B:
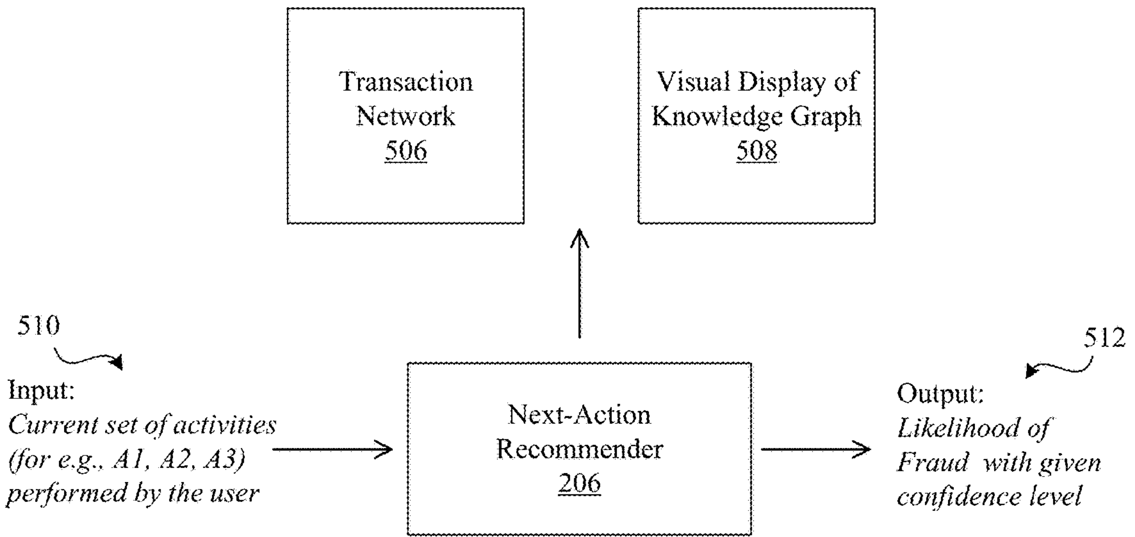

FIG. 4A illustrates knowledge graph 400 comprising activities A1, A2, A3, and A4 captured by activity tracker 202. Activity A1 applies data filters to extract for investigation of transactions greater than a predetermined amount (e.g., greater than $5,000) and/or occurring within a predetermined time interval (e.g., 12 months). Activity A2 applies a filter to identify transactions involving one or more tax heavens. Activity A3 identifies circular money patterns involving a specified entity. Activity A4 determines whether the specified entity has a connection with another entity named in a suspicious activity report (SAR). One or more of the activities may be repeated. For example, filtering for transactions greater than $500 can be performed multiple times and then repeated for transactions greater than $10,000.

Activity tracker 202 can capture a pattern of activities in real time in response to, and based on, processor-executable instructions input by the user to a computer that NAR framework 200 is implemented in or is operatively coupled with. The activities are performed by the user in the context of a specific investigation. The activities are captured by activity tracker 202 as a case-specific pattern of activities. Pattern recognition engine 204 can implement a model (e.g., generative model) trained to recognize patterns of activities in response to the input of data and meta data pertaining to transactions between specific parties and counterparties. Based on the input, pattern recognition engine outputs a description of the activities of a user performing an exploratory network analysis of the transactions.

Figure 4B:
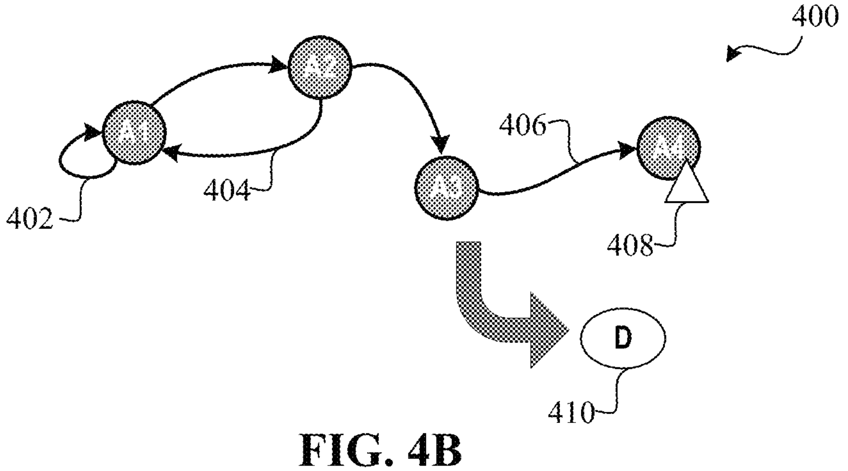

FIG. 4B illustrates pattern recognition engine 204's capability of distinguishing between activities that warrant retention versus those that do not. For example, activities corresponding to processor-executable instructions to hide labels or reorganize objects may be ignored or discarded by pattern recognition engine 204. By contrast, activities such as "pinning" objects of interest are captured by pattern detector tracker 204 for use in generating knowledge components.

One way pattern recognition engine 204 distinguishes between activities that warrant retention versus those that do not is by automatically recording the user's manually marking computer-implemented activities (e.g., inputting processor-executable instructions) as interesting or important. Pattern recognition 204 retains those activities for creating patterns and discards others. Another way is by pattern recognition engine 204's detecting the user's activity of creating an expanded a view of certain transactions and related aspects. For example, a pattern recognition engine 204 can identify the user's expanding a visual presentation of certain parties, accounts, and/or transactions within a graphical view of the network. If a view of a specific party, account, or transaction is expanded but not later collapsed, whereas other parties, accounts, and/or transactions are collapsed, then the retained expansion is detected and used by pattern recognition engine 204 to distinguish between activities corresponding to the expanded view and ones that do not.

As an example of pattern recognition engine 204's distinguishing between activities, consider a transactional network involving person a and three counterparties b1, b2, and b3. Initially the user may not know which counterparty is significant. The user selects counterparty b1 in examining the transactional network but finds nothing significant. The user returns to person a and examines transactions between person a and counterparty b2. If transactional aspects involving counterparty b2 are significant, the user can drill down into transaction data seeking more details. If the user finds nothing of significance with respect to counterparty b3, the user does not further examine details pertaining to transactions involving counterparty b3. Based on detecting the effort expended by the user with respect to the transaction involving b2, pattern recognition engine distinguishes between transactions pertaining to counterparty b2 and those involving the other two counterparties. The user's filtering the transactions by drilling down to data involving counterparty b2 is an activity captured by pattern recognition engine 204 along with metadata corresponding to the activity. The drilling down is captured by pattern recognition engine 204 as a significant user activity. The corresponding metadata can indicate whether the transaction data drilled into related to a tax heaven country. Transaction data and metadata of the transaction types involving b2 are retained by pattern recognition 204 and those pertaining to counterparties b1 and b3 are discarded. Only the data retained as significant is incorporated in the patterns captured by pattern recognition engine 204.

Illustratively in FIG. 4B, repeat connection 402 indicates that the user repeats activity A1 narrowing the transactions (e.g., further limiting examination of transactions greater than $10,000 to only those greater than $25,000). Repeat connection 404, conversely, indicates the user's relaxation of constraints (e.g., changing from looking only at transactions greater than $5,000 to including those greater than $1,000). With connection 406, pattern recognition engine 204 illustratively finds in performing activity A3 a suspicious transaction in which monies transferred by an originating party to another party are subsequently transferred back to the originating party. The user performs activity A4 to determine whether the party is named in a SAR. Illustratively, the user applies pin 408 to data identified by activity A4.

Thus, pattern recognition engine 204, for example, can identify each data drill down by examining the activity preceding an activity and the activity succeeding that same activity. Drill downs are useful information to include in a knowledge component generated by pattern recognition engine 204. Pattern recognition engine 204 can determine from the information whether repeating an activity is likely to enhance the exploratory network analysis. Pattern recognition engine 204, for example, also can identify information (e.g., a suspicious transaction or party) pinned by the user during the exploratory network analysis. Additionally, pattern recognition engine 204 records decision 410 indicating whether the user escalates the case (as likely money laundering) at the conclusion of the exploratory network analysis.

Pattern recognition engine 204, having determined which activities captured by activity tracker 202 are likely significant, combines the activities and associated metadata to generate the knowledge component corresponding pattern of activities of knowledge graph 400. Pattern recognition engine 204 stores the knowledge component in knowledge-base 208.

Figure 4C:
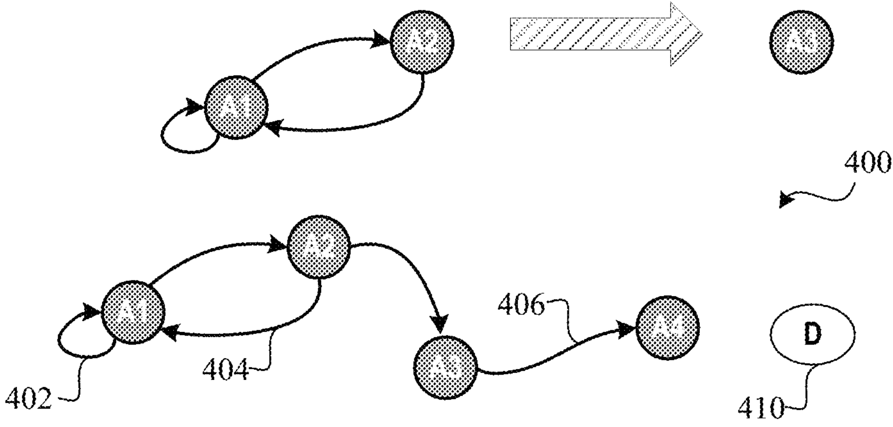

FIG. 4C illustrates operative features of NAR framework 200 with respect to a subsequent exploratory network analysis. Pattern of activities 412 is a partial pattern of current activities of the exploratory network analysis. The activities are captured by activity tracker 202 in response to detecting, by a computer processor, one or more processor-executatble instructions input to the computer by the user. Next-action recommender 206 predicts a best next activity based on pattern of activities 412. The prediction is generated by the machine learning model implemented by next-action recommender 206 and trained with prior knowledge components generated by pattern recognition engine 204 from patterns of past activities captured by activity tracker 202.

Illustratively, next-action recommender 206 recommends activity A3. Pattern of activities 412 is a partial pattern of prior pattern of activities 400. Next-action recommender 206's recommendation of activity A3 is based on the determination that 70 percent of the times that activities A1 and A2 were followed by activity A3, the exploratory network analysis generated a correct decision.

Next-action recommender 206 correlates decision 410 based on the network analysis performed with pattern of activities 400 and predicts that repeating the remaining activities A3 and A4 after activities A1 and A2 are 75 percent likely to escalate the case. Optionally, at the conclusion of the exploratory network analysis, next-action 206 generates a final decision based on the results of the full pattern of activities. The final decision can indicate that money laundering likely occurred. Next-action recommender 206 can generate the final decision based on the current activities performed and by correlating the current activities to past activities (e.g., comprising a knowledge graph) and decisions corresponding to the past activities.

Knowledge graphs are generated from knowledge components 214, which in turn are created from tracking user activities (e.g., input of processor-executable instructions to a computer) and metadata culled from significant network transactions. The activities and metadata are incorporated as nodes of a knowledge graph. Transitions from one activity to another are represented by the edges of the knowledge graph. The knowledge graphs are used to train the machine learning model implemented by next-action recommender 206. When pattern recognition engine 204 recognizes from an initial set of user activities of an existing pattern, the recognized pattern is fed to next-action recommender 206 as illustrated in FIG. 4C. Next-action recommender 206 generates a recommendation recommending that a user pursue action during the current exploratory analysis.

In certain embodiments, a knowledge graph corresponding to an existing pattern can be presented via a graphical user interface (GUI) visually to a user engaged in a current exploratory analysis. The visual presentation can present nodes and edges in a manner (e.g., different colorings, shadings, and/or markings) that indicate significant aspects determined from prior exploratory network analyses.

Figure 4D:
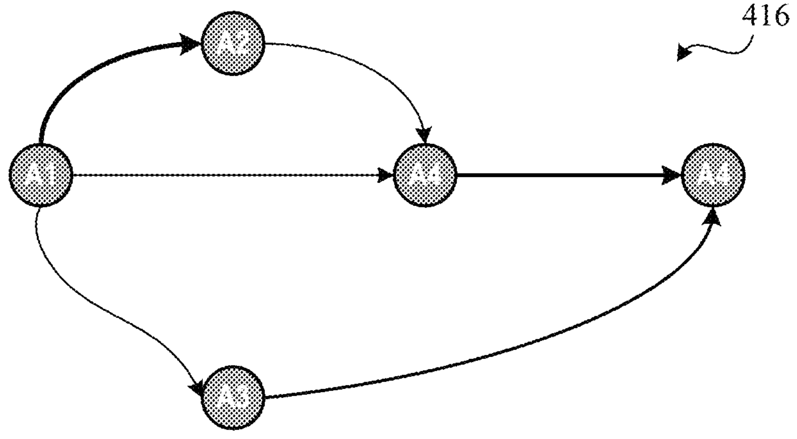

FIG. 4D illustrates example knowledge graph 416 in which the edges connecting activities visually indicate preferred patterns of activities based on prior exploratory network analyses. The edge connecting activity A1 to activity A2, for example, is thicker than the edge connecting A1 to activity A3. The thicker edge is a visual indication that past users found greater advantage in pursing activity A2 rather than A3 after performing activity A1. The comparable thicknesses of the edge connecting A3 to A5 and that connecting A4 to A5 indicates no relative advantage from proceeding either from activity A3 or A4, both are followed by activity A5. Various other visual cues can be used to indicate via the GUI preferred patterns of activities during an exploratory network analysis based on the results of past analyses.

FIGS. 5A and 5B illustrate certain operative features of next-action recommender 206 in relation to knowledge graphs. Next-action recommender 206, as described above, implements a machine learning model that can be trained using knowledge graphs constructed from knowledge components created from tracking the activities of prior exploratory network analyses. The machine learning model implemented by next-action recommender 206 can be a graph convolutional neural network (GCN) or other such model. Illustratively, next-action recommender 206 generates recommended set of best next actions 500, which can be conveyed visually in visual display of knowledge graph 502. The recommendation is based on the machine learning model predictions generated in response to input 504, which illustratively comprises a set of current activities of a user performing an on-going exploratory network analysis.

In FIG. 5B, the machine learning model (e.g., GCN) implemented by next-action recommender 206 is trained to detect fraudulent transactions. Next-action recommender 206 illustratively generates transaction network 506 currently under exploratory network analysis and visual display of knowledge graph 508. Visual display of knowledge graph 508 shows one or more recommended best next actions for the user to take, the recommendation generated by the machine learning model in response to input 510 of a set of current user activities. Next-action recommender 206 can also generate output 512. Output 512 gives a likelihood of fraud, which with a given confidence level, is predicted based on data and meta data generated by the exploratory network analysis activities of the user.

The terminology used herein is for the purpose of describing particular embodiments only and is not intended to be limiting. Notwithstanding, several definitions that apply throughout this document now will be presented.

As defined herein, the term "approximately" means nearly correct or exact, close in value or amount but not precise. For example, the term "approximately" may mean that the recited characteristic, parameter, or value is within a predetermined amount of the exact characteristic, parameter, or value.

As defined herein, the terms "at least one," "one or more," and "and/or," are open-ended expressions that are both conjunctive and disjunctive in operation unless explicitly stated otherwise. For example, each of the expressions "at least one of A, B and C." "at least one of A. B, or C." "one or more of A, B, and C." "one or more of A, B, or C." and "A, B, and/or C" means A alone, B alone, C alone, A and B together, A and C together, B and C together, or A, B and C together.

As defined herein, the term "automatically" means without user intervention.

As defined herein, the terms "includes," "including." "comprises," and/or "comprising." specify the presence of stated features, integers, steps, operations, elements, and/or components, but do not preclude the presence or addition of one or more other features, integers, steps, operations, elements, components, and/or groups thereof.

As defined herein, the term "if" means "when" or "upon" or "in response to" or "responsive to," depending upon the context. Thus, the phrase "if it is determined" or "if [a stated condition or event] is detected" may be construed to mean "upon determining" or "in response to determining" or "upon detecting [the stated condition or event]" or "in response to detecting [the stated condition or event]" or "responsive to detecting [the stated condition or event]" depending on the context.

As defined herein, the terms "one embodiment," "an embodiment," "in one or more embodiments," "in particular embodiments," or similar language mean that a particular feature, structure, or characteristic described in connection with the embodiment is included in at least one embodiment described within this disclosure. Thus, appearances of the aforementioned phrases and/or similar language throughout this disclosure may, but do not necessarily, all refer to the same embodiment.

As defined herein, the term "output" means storing in physical memory elements, e.g., devices, writing to display or other peripheral output device, sending or transmitting to another system, exporting, or the like.

As defined herein, the term "processor" means at least one hardware circuit configured to carry out instructions. The instructions may be contained in program code. The hardware circuit may be an integrated circuit. Examples of a processor include, but are not limited to, a central processing unit (CPU), an array processor, a vector processor, a digital signal processor (DSP), a field-programmable gate array (FPGA), a programmable logic array (PLA), an application specific integrated circuit (ASIC), programmable logic circuitry, and a controller.

As defined herein, "real time" means a level of processing responsiveness that a user or system senses as sufficiently immediate for a particular process or determination to be made, or that enables the processor to keep up with some external process.

As defined herein, the term "responsive to" means responding or reacting readily to an action or event. Thus, if a second action is performed "responsive to" a first action, there is a causal relationship between an occurrence of the first action and an occurrence of the second action. The term "responsive to" indicates the causal relationship.

As defined herein, the term "substantially" means that the recited characteristic, parameter, or value need not be achieved exactly, but that deviations or variations, including for example, tolerances, measurement error, measurement accuracy limitations, and other factors known to those of skill in the art, may occur in amounts that do not preclude the effect the characteristic was intended to provide.

As defined herein, the term "user" refers to a human being.

The terms "first," "second," etc. may be used herein to describe various elements. These elements should not be limited by these terms, as these terms are only used to distinguish one element from another unless stated otherwise or the context clearly indicates otherwise.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A computer-implemented method by a computer hardware system including an activity tracker, a pattern recognition engine, and a machine learning model, the computer-implemented method comprising:

capturing, by the activity tracker, a plurality of processor-executable instructions input into a computer by a user during an exploratory network analysis, wherein the exploratory network analysis determines characteristics of interconnected nodes of a graph network and detects a suspicious transaction using the interconnected nodes of the graph network, and the interconnected nodes of the graph network represent transaction data;

identifying, by the activity tracker, a set of current activities executed on the computer and corresponding to the plurality of processor-executable instructions, wherein the set of current activities includes user interactions associated with a graphical view of the graph network and the transaction data, the set of current activities includes a drill down operation on the transaction data, and in the drill down operation, a first level of the transaction data is shifted to a second level of the transaction data that provides more detailed information than that of the first level of the transaction data;

searching, by the pattern recognition engine, a knowledge base for an electronically-stored activity pattern corresponding to the set of current activities;

correlating, by the pattern recognition engine, based on the searching, the set of current activities to past activities in the knowledge base, wherein the past activities correspond to a past decision;

extracting metadata associated with the past activities;

generating, by the pattern recognition engine, a knowledge graph using the metadata associated with the past activities and a subset of activities of the set of current activities, wherein the subset of activities is obtained by discarding non-significant activities of the set of current activities based on the drill down operation, the knowledge graph includes:

a plurality of nodes that includes a first node that represents an activity of the subset of activities, a second node that represents a first past activity of the past activities, and a third node that represents a second past activity of the past activities; and a plurality of edges that includes a first edge between the first node and the second node, and a second edge between the first node and the third node;

predicting the first past activity as a next activity, wherein a relative thickness of the first edge and the second edge visually indicates that the first past activity corresponds to a preferred pattern of activities relative to the second past activity;

training the machine learning model based on the knowledge graph;

processing, by the trained machine learning model, the electronically-stored activity pattern;

generating, by the trained machine learning model, based on the processing, an additional processor-executable instruction that corresponds to the next activity to be executed during the exploratory network analysis; and causing the computer to execute the additional processor-executable instruction to perform the next activity during the exploratory network analysis.

2. The computer-implemented method of claim 1, wherein the pattern recognition engine is configured to generate the knowledge graph using knowledge components including the past activities.

3. The computer-implemented method of claim 1, wherein the pattern recognition engine is configured to generate a new knowledge graph upon not identifying an activity pattern corresponding to the set of current activities.

4. The computer-implemented method of claim 1, wherein the set of current activities includes applying a data filter including the drill down operation, and applying an annotation to the transaction data.

5. A computer hardware system including an activity tracker, a pattern recognition engine, and a machine learning model, the computer hardware system comprising:

a hardware processor configured to execute following operations:

capturing, by the activity tracker, a plurality of processor-executable instructions input into a computer by a user during an exploratory network analysis, wherein the exploratory network analysis determines characteristics of interconnected nodes of a graph network and detects a suspicious transaction using the interconnected nodes of the graph network, and the interconnected nodes of the graph network represent transaction data;

identifying, by the activity tracker, a set of current activities executed on the computer and corresponding to the plurality of processor-executable instructions, wherein the set of current activities includes user interactions associated with a graphical view of the graph network and the transaction data, the set of current activities includes a drill down operation on the transaction data, and in the drill down operation, a first level of the transaction data is shifted to a second level of the transaction data that provides more detailed information than that of the first level of the transaction data;

searching, by the pattern recognition engine, a knowledge base for an electronically-stored activity pattern corresponding to the set of current activities;

correlating, by the pattern recognition engine, based on the searching, the set of current activities to past activities in the knowledge base, wherein the past activities correspond to a past decision;

extracting metadata associated with the past activities;

generating, by the pattern recognition engine, a knowledge graph using the metadata associated with the past activities and a subset of activities of the set of current activities, wherein the subset of activities is obtained by discarding non-significant activities of the set of current activities based on the drill down operation, the knowledge graph includes:

a plurality of nodes that includes a first node that represents an activity of the subset of activities, a second node that represents a first past activity of the past activities, and a third node that represents a second past activity of the past activities; and a plurality of edges that includes a first edge between the first node and the second node, and a second edge between the first node and the third node;

predicting the first past activity as a next activity, wherein a relative thickness of the first edge and the second edge visually indicates that the first past activity corresponds to a preferred pattern of activities relative to the second past activity;

training the machine learning model based on the knowledge graph;

processing, by the trained machine learning model, the electronically-stored activity pattern;

generating, by the trained machine learning model, based on the processing, an additional processor-executable instruction that corresponds to the next activity to be executed during the exploratory network analysis; and causing the computer to execute the additional processor-executable instruction to perform the next activity during the exploratory network analysis.

6. The computer hardware system of claim 5, wherein the pattern recognition engine is configured to generate the knowledge graph using knowledge components including the past activities.

7. The computer hardware system of claim 5, wherein the pattern recognition engine is configured to generate a new knowledge graph upon not identifying an activity pattern corresponding to the set of current activities.

8. The computer hardware system of claim 5, wherein the set of current activities includes applying a data filter including the drill down operation, and applying an annotation to the transaction data.

9. A computer program product, comprising a computer readable hardware storage device having stored therein a program code, the program code, which when executed by a computer hardware system including an activity tracker, a pattern recognition engine, and a machine learning model, causes the computer hardware system to perform:

capturing, by the activity tracker, a plurality of processor-executable instructions input into a computer by a user during an exploratory network analysis, wherein the exploratory network analysis determines characteristics of interconnected nodes of a graph network and detects a suspicious transaction between the interconnected nodes of the graph network, and the interconnected nodes of the graph network represent transaction data;

identifying, by the activity tracker, a set of current activities, executed on the computer for the exploratory network analysis, corresponding to the plurality of processor-executable instructions, wherein the set of current activities includes user interactions associated with a graphical view of the graph network and the transaction data, the set of current activities includes a drill down operation on the transaction data, and in the drill down operation, a first level of the transaction data is shifted to a second level of the transaction data that provides more detailed information than that of the first level of the transaction data;

searching, by the pattern recognition engine, a knowledge base for an electronically-stored activity pattern corresponding to the set of current activities;

correlating, by the pattern recognition engine, based on the searching, the set of current activities to past activities in the knowledge base, wherein the past activities correspond to a past decision;

extracting metadata associated with the past activities;

generating, by the pattern recognition engine, a knowledge graph using the metadata associated with the past activities and a subset of activities of the set of current activities, wherein the subset of activities is obtained by discarding non-significant activities of the set of current activities based on the drill down operation, the knowledge graph includes:

a plurality of nodes that includes a first node that represents an activity of the subset of activities, a second node that represents a first past activity of the past activities, and a third node that represents a second past activity of the past activities; and a plurality of edges that includes a first edge between the first node and the second node, and a second edge between the first node and the third node;

predicting the first past activity as a next activity, wherein a relative thickness of the first edge and the second edge visually indicates that the first past activity corresponds to a preferred pattern of activities relative to the second past activity;

training the machine learning model based on the knowledge graph;

processing, by the trained machine learning model, the electronically-stored activity pattern;

generating, by the trained machine learning model, based on the processing, an additional processor-executable instruction that corresponds to the next activity to be executed during the exploratory network analysis; and causing the computer to execute the additional processor-executable instruction to perform the next activity during the exploratory network analysis.

10. The computer program product of claim 9, wherein the pattern recognition engine is configured to generate the knowledge graph using knowledge components including the past activities.

11. The computer program product of claim 9, wherein the pattern recognition engine is configured to generate a new knowledge graph upon not identifying an activity pattern corresponding to the set of current activities.

12. The computer-implemented method of claim 1, further comprising:

automatically recording, by the pattern recognition engine, the subset of activities as significant based on the drill down operation.

13. The computer-implemented method of claim 12, further comprising:

creating, based on the correlating, from the subset of activities, a set of patterns for the generating of the knowledge graph.

14. The computer-implemented method of claim 1, further comprising:

determining that a past exploratory network analysis generated a correct decision in a case where a specific number of times the second past activity and a third past activity of the past activities are followed by the first past activity, wherein the predicting of the first past activity as the next activity is based on the determining that the past exploratory network analysis generated the correct decision in the case where the specific number of times the second past activity and the third past activity are followed by the first past activity.

15. The computer hardware system of claim 5, wherein the operations further comprise:

automatically recording, using the pattern recognition engine, the subset of activities as significant based on the drill down operation; and creating, based on the correlating, from the subset of activities, a set of patterns for the generating of the knowledge graph.

16. The computer hardware system of claim 5, wherein the operations further comprise:

determining that a past exploratory network analysis generated a correct decision in a case where a specific number of times the second past activity and a third past activity of the past activities are followed by the first past activity, wherein the predicting of the first past activity as the next activity is based on the determining that the past exploratory network analysis generated the correct decision in the case where the specific number of times the second past activity and the third past activity are followed by the first past activity.

17. The computer program product of claim 9, wherein the program code further causes the computer hardware system to perform:

automatically recording, using the pattern recognition engine, the subset of activities as significant based on the drill down operation; and creating, based on the correlating, from the subset of activities, a set of patterns for the generating of the knowledge graph.

18. The computer program product of claim 9, wherein the program code further causes the computer hardware system to perform:

determining that a past exploratory network analysis generated a correct decision in a case where a specific number of times the second past activity and a third past activity of the past activities are followed by the first past activity, wherein the predicting of the first past activity as the next activity is based on the determining that the past exploratory network analysis generated the correct decision in the case where the specific number of times the second past activity and the third past activity are followed by the first past activity.

* * * * *